United States Patent
Burnham et al.

(10) Patent No.: US 6,301,695 B1
(45) Date of Patent: Oct. 9, 2001

(54) METHODS TO SECURELY CONFIGURE AN FPGA USING MACRO MARKERS

(75) Inventors: James L. Burnham, Morgan Hill; Gary R. Lawman, San Jose, both of CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/231,912

(22) Filed: Jan. 14, 1999

(51) Int. Cl.[7] ............... G06F 17/50; G06F 15/177; G06F 19/00
(52) U.S. Cl. ............... 716/16; 716/17; 713/1; 713/100; 340/825.91; 340/825.93
(58) Field of Search ............... 716/1–21; 713/1, 713/2, 100; 340/825.83–825.93

(56) References Cited

U.S. PATENT DOCUMENTS

| | | |
|---|---|---|
| Re. 34,363 | 8/1993 | Freeman et al. . |
| 3,849,760 | 11/1974 | Endou et al. ............... 382/205 |
| 4,849,904 * | 7/1989 | Aipperspach et al. ............ 716/17 |
| 5,084,636 | 1/1992 | Yoneda ............... 326/39 |
| 5,128,871 * | 7/1992 | Schmitz ............... 716/17 |
| 5,197,016 * | 3/1993 | Sugimoto et al. ............... 716/8 |
| 5,237,218 | 8/1993 | Josephson et al. ............... 326/41 |
| 5,237,219 | 8/1993 | Cliff ............... 326/41 |
| 5,343,406 | 8/1994 | Freeman et al. ............... 716/16 |
| 5,394,031 | 2/1995 | Britton et al. ............... 326/38 |
| 5,457,408 | 10/1995 | Leung ............... 326/38 |
| 5,574,655 * | 11/1996 | Knapp et al. ............... 716/17 |
| 5,705,938 | 1/1998 | Kean ............... 326/39 |
| 5,909,658 * | 6/1999 | Clarke et al. ............... 702/126 |
| 5,946,478 * | 8/1999 | Lawman ............... 716/17 |
| 6,205,574 * | 3/2001 | Dellinger et al. ............... 716/16 |

FOREIGN PATENT DOCUMENTS

| | | | |
|---|---|---|---|
| 0 253 530 | 6/1987 | (EP) | ............... H03K/19/177 |
| WO 92/20157 | 12/1992 | (WO) | ............... H03K/19/177 |
| WO 94/10754 | 5/1993 | (WO) | ............... H03K/19/177 |
| WO 94/01867 | 1/1994 | (WO) | ............... G11C/13/00 |

OTHER PUBLICATIONS

Wong et al. ("A single–chip FPGA implementation of the data encryption standard (DES) algorithm", IEEE Global Telecommunications Conference, 1998, Globecom 1998, The Bridge to Global Integration, vol. 2, pp. 827–832), Nov. 1998.*

Runje et al. ("Universal strong encryption FPGA core implementation", Proceedings of Design, Automation and Test in Europe, 1998, pp. 923–924), Feb. 1998.*

Kean et al. ("DES key breaking, encryption and decryption on the XC6216", Proceedings of IEEE Symposium on FPGAs for Custom Computing Machines, 1998, pp. 310–311), Apr. 1998.*

(List continued on next page.)

*Primary Examiner*—Matthew Smith
*Assistant Examiner*—Phallaka Kik
(74) *Attorney, Agent, or Firm*—Edward S. Mao; Lois D. Cartier

(57) ABSTRACT

A method is provided for securely configuring an FPGA with macros. Specifically, if an end user desires to use a macro from a macro vendor, the end user creates a marked design file containing a macro marker rather than the actual macro. The marked design file is converted into configuration data by a macro manager. Specifically, the macro manager obtains the macro from the macro vendor and replaces the macro marker with the macro prior to converting the design file into configuration data. The macro manager provides the configuration data to the end user. Because only the macro manager has access to the macro, the possibility of unlicensed use of the macro is diminished.

29 Claims, 4 Drawing Sheets

OTHER PUBLICATIONS

Box ("Field Programmable gate array based configurable preprocessor", Proceedings of the IEEE 1994 National Aerospace and Electronics Conference, 1994, NAECON 1994, vol. 1, pp. 427–434), May 1994.*

Shi et al. ("Maco block based FPGA floorplanning", Proceedings of the Tenth International Conference on VLSI Design, 1997, pp. 21–26), Jan. 1997.*

McCarley et al. ("Macro–instruction generation for dynamic logic caching", Proceedings of the 8th IEEE International Workshop on Rapic System Prototyping, pp. 63–69), Jun. 1997.*

Patriquin et al. ("An automated for the CHAMP module", Proceedings of the IEEE 1995 National Aerospace and Electronics Conference, 1995, NAEC, vol. 1, pp. 417–424), May 1995.*

Xilinx, Inc.; "The Programmable Logic Data Book"; Sep. 1996; available from Xilinx, Inc., 2100 Logic Drive, San Jose, California 95124; in its entirety and also specifically pp. 4–54 to 4–79 and 4–253 to 4–286.

Xilinx, Inc.; "Core Solutions Data Book" published May 1997; available from Xilinx, Inc., 2100 Logic Drive, San Jose, California 95124; pp 2–5 to 2–13.

Xilinx, Inc.; "The Programmable Logic Data Book"; 1994; available from Xilinx, Inc., 2100 Logic Drive, San Jose, California 95124; pp. 2–105 to 2–132 and 2–231 to 2–238.

D. D. Gajski et al.; "Computer Architecture—An Overview of Advances in Computer Architecture"; IEEE Tutorial Manual, IEEE Computer Society; 1987; pp. v–vi.

Gediminas P. Kurpis et al.; "The New IEEE Standard Dictionary of Electrical and Electronics Terms"; Jan. 15, 1993, p. 1011.

"IEEE Standard Test Access Port and Boundary–Scan Architecture"; IEEE Std 1149.1–1990; includes IEEE Std 1149–1a–1993; published Oct. 21, 1993.

David A. Patterson et al., "Computer Architecture A Quantitative Approach"; published 1990; pp. 200–201.

Betty Prince; *Semiconductor Memories;* Chapter 5—"Basic Memory Architecture and Cell Structure"; Copyright 1983, 1991 by Wiley & Sons Ltd.; pp. 149–174.

Paul R. Gray et al.; *Analog MOS Integrated Circuits;* "Potential of MOS Technologies for Analog Integrated Circuits" by David A. Hodges et al.; IEEE Press; Copyright 1980; pp. 2–11.

Wong et al., "A single–Chip FPGA Implementation of the Data Encryption Standard (DES) Algorithm", IEEE Global Telecommunications Conference, 1998, GLOBECOM 1998, The Bridge to Global Integration, vol. 2, pp. 827–832.

Runje et al., "Universal Strong Encryption FPGA Core Implementation", Proceedings of Design, Automation, and Test in Europe, 1998, pp. 923–924.

Kean et al., "DES Key Breaking, Encryption, and Decryption on the XC6216", Proceedings of IEEE Symposium on FPGAs for Custom Computing Machines, 1998, pp. 310–311.

"The Programmable Logic Data Book", published 1998, available from Xilinx, Inc., 2100 Logic Drive, San Jose, California 95124, pp. 4–46 to 4–59.

* cited by examiner

METHODS TO SECURELY CONFIGURE AN FPGA USING MACRO MARKERS

CROSS-REFERENCE TO RELATED APPLICATIONS

This application relates to concurrently filed, co-pending U.S. patent application Ser. No. 09/232,022, "FPGA CUSTOMIZABLE TO ACCEPT SELECTED MACROS", by Burnham et al., owned by the assignee of this application and incorporated herein by reference.

This application relates to concurrently filed, co-pending U.S. patent application Ser. No. 09/232,021, "METHODS TO SECURELY CONFIGURE AN FPGA TO ACCEPT SELECTED MACROS", by Burnham et al., owned by the assignee of this application and incorporated herein by reference .

This application relates to concurrently filed, co-pending application Ser. No. 09/231,528, "METHODS TO SECURELY CONFIGURE AN FPGA USING ENCRYPTED MACROS", by Burham, owned by the assignee of this application and incorporated herein by reference.

This application relates to U.S. patent application Ser. No. 09/000,519 now Pat. No. 6,028,445 entitle "DECODER STRUCTURE AND METHOD FOR FPGA CONFIGURATION" by Gary R. Lawman, which is also incorporated herein by reference.

FIELD OF INVENTION

The present invention relates to programmable devices such as field programmable gate arrays (FPGAs). More specifically, the present invention relates to methods for programming licensed software in an FPGA.

BACKGROUND OF THE INVENTION

Due to advancing semiconductor processing technology, integrated circuits have greatly increased in functionality and complexity. For example, programmable devices such as field programmable gate arrays (FPGAs) and programmable logic devices (PLDs), can incorporate ever-increasing numbers of functional blocks and more flexible interconnect structures to provide greater functionality and flexibility.

FIG. 1 is a simplified schematic diagram of a conventional FPGA 110. FPGA 110 includes user logic circuits such as input/output blocks (IOBs), configurable logic blocks (CLBs), and programmable interconnect 130, which contains programmable switch matrices (PSMs). Each IOB and CLB can be configured through configuration port 120 to perform a variety of functions. Programmable interconnect 130 can be configured to provide electrical connections between the various CLBs and IOBs by configuring the PSMs and other programmable interconnection points (PIPS, not shown) through configuration port 120. Typically, the IOBs can be configured to drive output signals or to receive input signals from various pins (not shown) of FPGA 110.

FPGA 110 also includes dedicated internal logic. Dedicated internal logic performs specific functions and can only be minimally configured by a user. For example, configuration port 120 is one example of dedicated internal logic. Other examples may include dedicated clock nets (not shown), power distribution grids (not shown), and boundary scan logic (i.e. IEEE Boundary Scan Standard 1149.1, not shown).

FPGA 110 is illustrated with 16 CLBS, 16 IOBs, and 9 PSMs for clarity only. Actual FPGAs may contain thousands of CLBS, thousands of IOBs, and thousands of PSMs. The ratio of the number of CLBs, IOBs, and PSMs can also vary.

FPGA 110 also includes dedicated configuration logic circuits to program the user logic circuits. Specifically, each CLB, IOB, PSM, and PIP contains a configuration memory (not shown) which must be configured before each CLB, IOB, PSM, or PIP can perform a specified function. Typically the configuration memories within an FPGA use static random access memory (SRAM) cells. The configuration memories of FPGA 110 are connected by a configuration structure (not shown) to configuration port 120 through a configuration access port (CAP) 125. A configuration port (a set of pins used during the configuration process) provides an interface for external configuration devices to program the FPGA. The configuration memories are typically arranged in rows and columns. The columns are loaded from a frame register which is in turn sequentially loaded from one or more sequential bitstreams. (The frame register is part of the configuration structure referenced above.) In FPGA 110, configuration access port 125 is essentially a bus access point that provides access from configuration port 120 to the configuration structure of FPGA 110.

FIG. 2 illustrates a conventional method used to configure FPGA 110. Specifically, FPGA 110 is coupled to a configuration device 230 such as a serial programmable read only memory (SPROM), an electrically programmable read only memory (EPROM), or a microprocessor. Configuration port 120 receives configuration data, usually in the form of a configuration bitstream, from configuration device 230. Typically, configuration port 120 contains a set of mode pins, a clock pin and a configuration data input pin. Configuration data from configuration device 230 is transferred serially to FPGA 110 through the configuration data input pin. In some embodiments of FPGA 110, configuration port 120 comprises a set of configuration data input pins to increase the data transfer rate between configuration device 230 and FPGA 110 by transferring data in parallel. However, due to the limited number of dedicated function pins available on an FPGA, configuration port 120 usually has no more than eight configuration data input pins. Further, some FPGAs allow configuration through a boundary scan chain. Specific examples for configuring various FPGAs can be found on pages 4–46 to 4–59 of "The Programmable Logic Data Book", published in January, 1998 by Xilinx, Inc., and available from Xilinx, Inc., 2100 Logic Drive, San Jose, Calif. 95124, which pages are incorporated herein by reference. Additional methods to program FPGAs are described by Lawman in commonly assigned, co-pending U.S. patent application Ser. No. 09/000,519, entitled "DECODER STRUCTURE AND METHOD FOR FPGA CONFIGURATION" by Gary R. Lawman.

As explained above, actual FPGAs can have thousands of CLBs, IOBs, PSMs, and PIPs; therefore, the design and development of FPGA software is very time-consuming and expensive. Consequently, many vendors provide macros for various functions that can be incorporated by an end user of the FPGA into the user's own design file. For example, Xilinx, Inc. provides a PCI interface macro, which can be incorporated by an end user into the user's design file. The user benefits from the macro because the user does not need to spend the time or resources to develop the macro. Further, since the vendor profits from selling the same macro to many users, the vendor can spend the time and resources to design optimized macros. For example, the vendor strives to provide macros having high performance, flexibility, and low gate count. However, the macro vendors are reluctant to give out copies of the macros without a way of insuring that the macros are used only by licensed users. Hence, there is a need for a method or structure to insure third party macros are used only by licensed end users.

SUMMARY OF THE INVENTION

The present invention uses macro markers in design files to insure only licensed users can use macros in FPGAs. Specifically, an end user creates a marked design file by incorporating a macro marker in the end user's FPGA design file instead of the actual macro. A macro manager (e.g., a third party or a software server) replaces the macro markers with the actual macro and converts the design file into configuration data that incorporates the macro. The macro manager can send the configuration data back to the end user or configure an FPGA with the configuration data and send the configured FPGA to the end user. Usually, the macro vendor provides copies of the macro marker to the end user and copies of the macro to the macro manager. The macro manager collects appropriate licensing fees from the end user and distributes the licensing fee to the macro vendor.

In accordance with a second embodiment of the present invention, a macro manager obtains macros from various macro providers. Thus, the macro manager can accommodate end users who wish to use macros from different macro vendors in the same design file. Thus, an end user can create a marked design file incorporating a first macro marker identifying a first macro and a second macro marker identifying a second macro. The first macro and second macro can be provided by different macro vendors. The macro manager replaces the first macro marker with the first macro and replaces the second macro marker with the second macro. The macro manager then converts the design file into configuration data for the user. The present invention will be more fully understood in view of the following description and drawings.

DETAILED DESCRIPTION OF THE DRAWINGS

Figure 1:
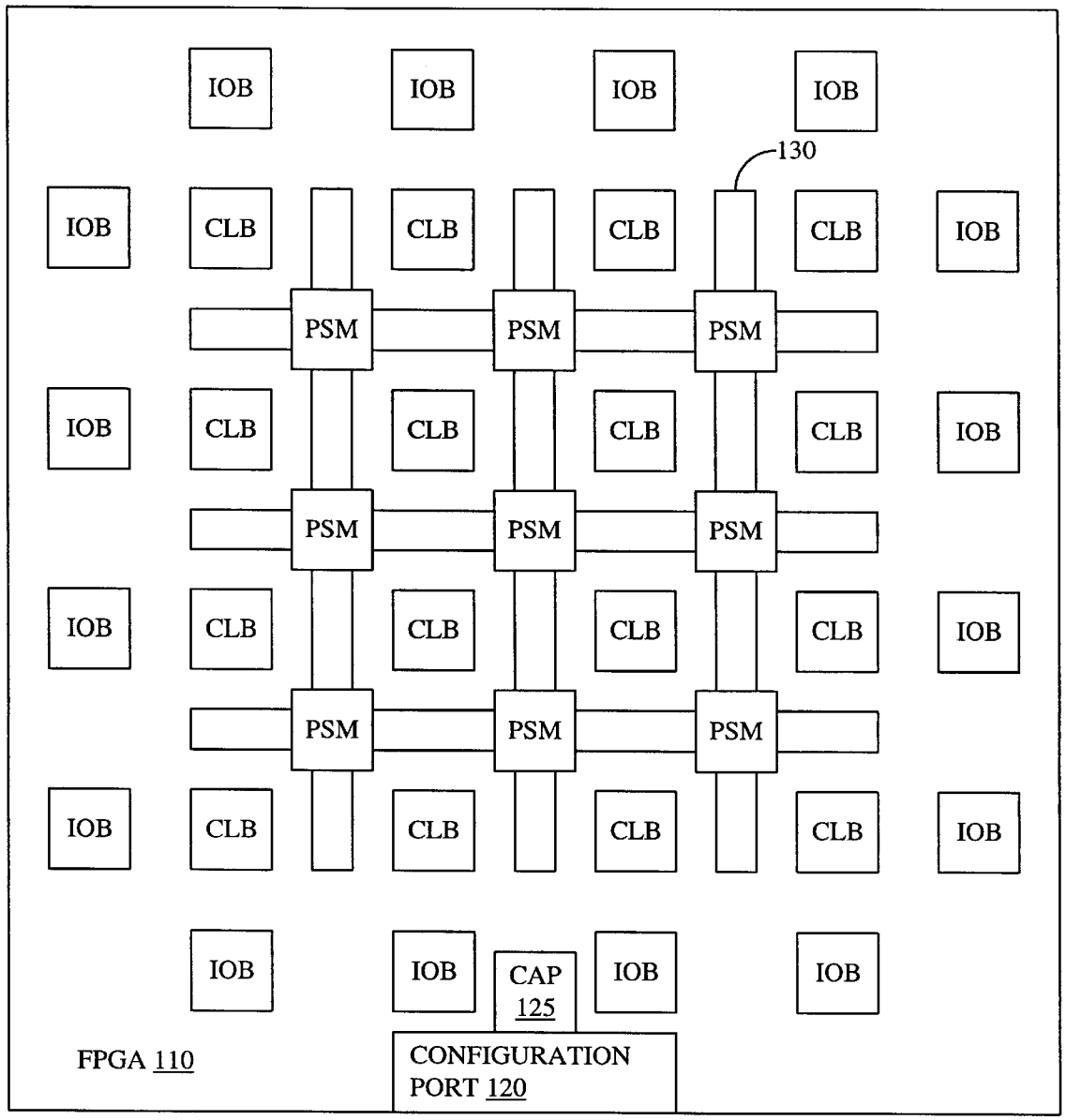
FIG. 1 is a simplified schematic diagram of a conventional FPGA.
Figure 2:
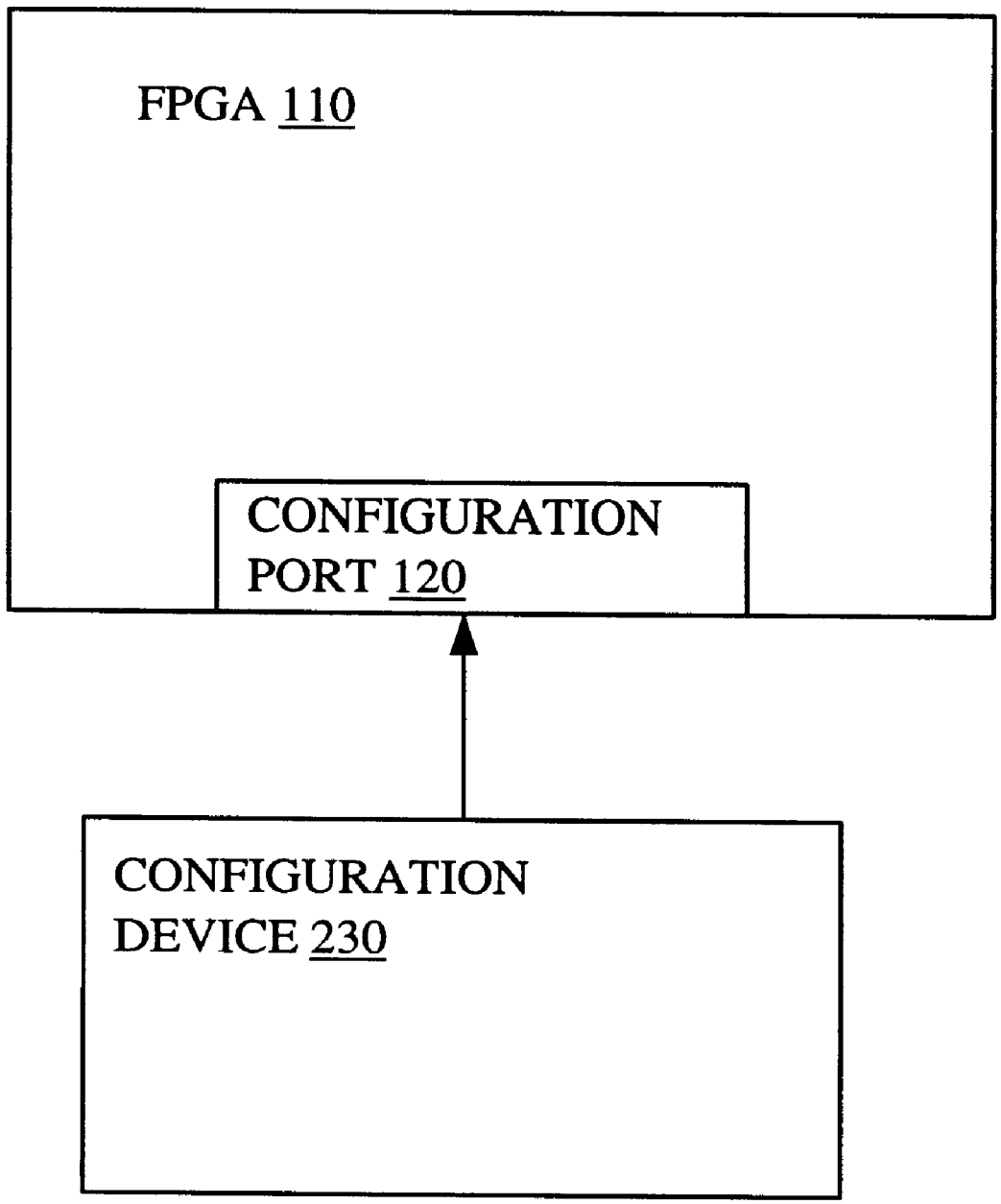
FIG. 2 is a prior art schematic diagram of an FPGA configured with a configuration device.
Figure 3:
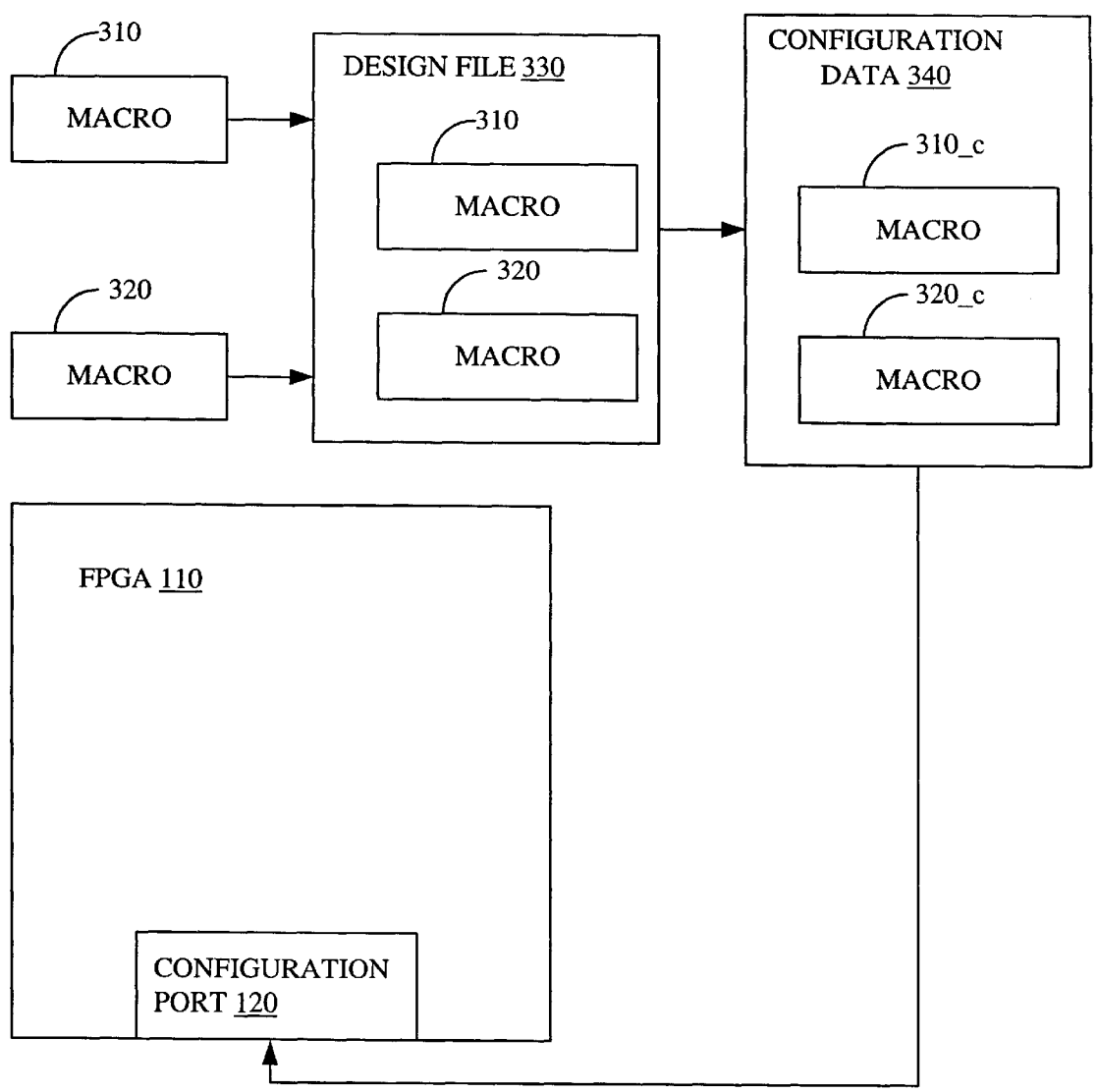
FIG. 3 illustrates a prior art method of programming an FPGA using macros.

FIG. 3 illustrates a conventional manner of configuring an FPGA using macros. In FIG. 3, an end user (not shown) desires to program FPGA 110 with a macro 310 and a macro 320. Typically, the end user creates a design file 330, which includes macro 310 and macro 320. Design file 330 is converted into configuration data 340. Configuration data 340 contains macro 310_c, which is the converted version of macro 310, and macro 320_c, which is the converted version of macro 320. The converted versions of the macros typically take the form of portions of a configuration bitstream. Configuration data 340 also typically takes the form of a configuration bitstream. Configuration data 340 is sent into FPGA 110 through configuration port 120 to configure FPGA 110. As stated above, the macro vendors providing macros 310 and 320 may not wish to make macro 310 and macro 320 easily available due to fear of unlicensed use.

Figure 4:
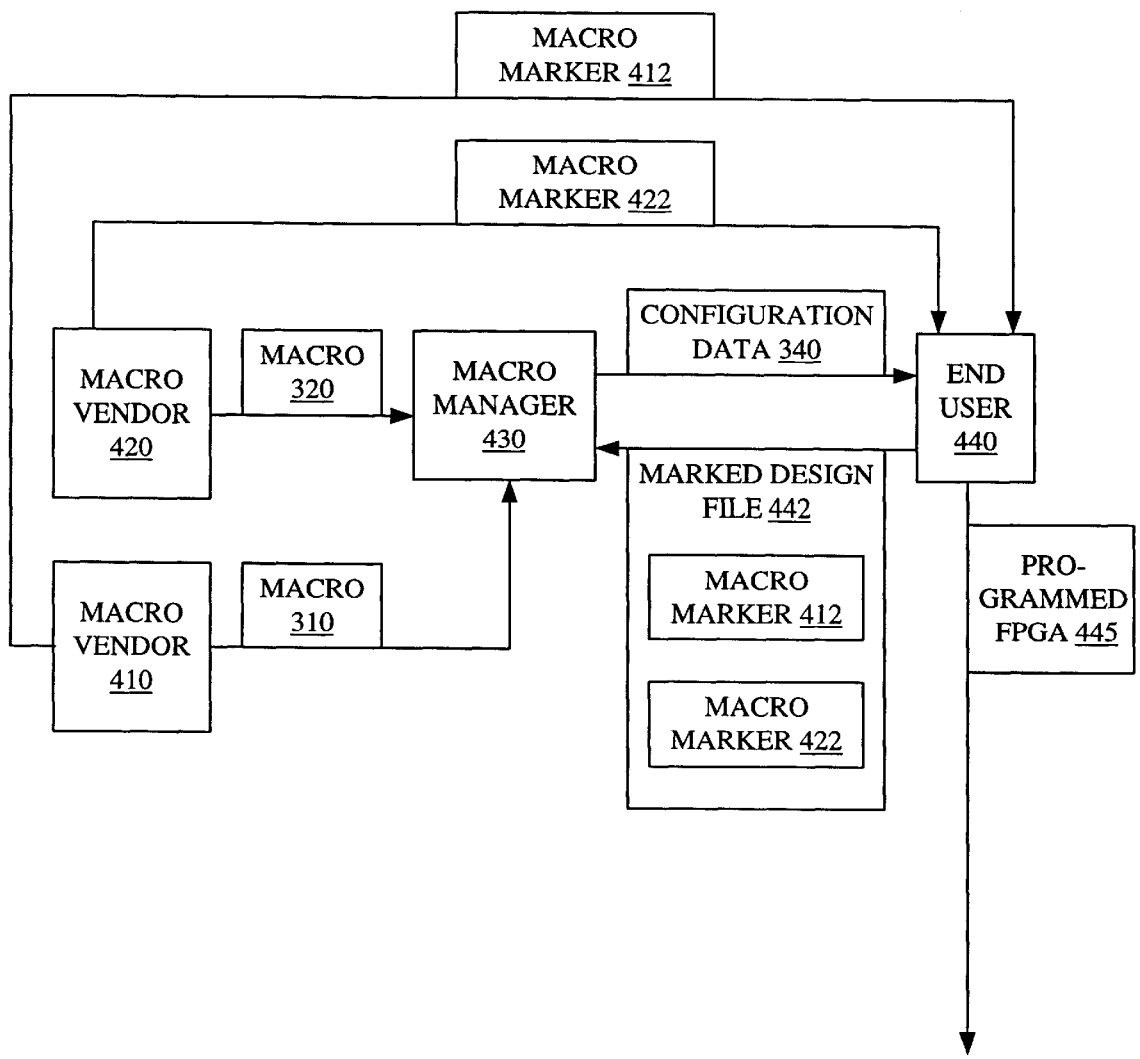
FIG. 4 illustrates a method of programming an FPGA in accordance with one embodiment of the present invention.

FIG. 4 illustrates a method to program macros into FPGAs without fear of piracy in accordance with one embodiment of the present invention. In FIG. 4, an end user 440 wishes to create an FPGA using macro 310 from macro vendor 410 and a macro 320 from macro vendor 420. Instead of providing a copy of macro 310 to end user 440, macro vendor 410 provides a macro marker 412 to end user 440. Macro vendor 410 provides macro 310 to a macro manager 430. Similarly, macro vendor 420 provides a macro marker 422 to end user 440 and macro 320 to macro manager 430.

Macro marker 412 contains information identifying macro 310 that can be used by end user 440 to create and test a design file, which will incorporate macro 310. Specifically, macro marker 412 contains information regarding the FPGA resources (e.g., CLBs, IOBs, PSMs) required by macro 310. Furthermore, macro marker 412 contains information regarding how circuits designed by end user 440 can interface to the circuits defined by macro 310. In some embodiments, macro marker 412 also contains information for simulating the circuits defined by macro 310 so that end user 440 can simulate the design file containing macro marker 412. Macro marker 422 contains similar information regarding macro 320.

End user 440 creates a marked design file 442 containing macro marker 412 and macro marker 422. End user 440 sends marked design file 442 to macro manager 430. Macro manager 430 replaces macro markers 412 and 422 with macros 310 and 320, respectively. Macro manager 430 then converts design file 442 into configuration data 340. Since reverse engineering macro 310 and macro 320 from configuration data 340 is difficult, configuration data can be sent back to end user 440 with limited risk of disclosure and piracy of macros 310 and 320. End user 440 then configures an FPGA with configuration data 340 (which is based on marked design file 442), to create programmed FPGA 445, which includes circuits defined by macros 310 and 320.

In some embodiments, macro manager 430 is a software server, which can be accessed by end user 440 by way of a secure medium such as a private network, telephone connection, or an encrypted channel of a public network. For example, in one embodiment macro manager 430 is a web server that receives encrypted configuration files from end user 440 over the internet and sends configuration data over the internet to end user 440. In one embodiment, macro manager 430 is implemented using the Java™ environment. ("Java" is a trademark of Sun Microsystems, Inc.)

Alternatively, macro manager 430 can configure an FPGA with configuration data 340 and send the programmed FPGA to end user 340. Generally, macro manager 430 also has the responsibility for collecting appropriate licensing fees from end user 440 and distributing the licensing fees to macro vendors 410 and 420. Thus, end user 440 can create an FPGA containing circuits defined by third-party macros, while minimizing the risk of unlicensed use of the macros. The services of the macro manager may be provided by the manufacturer of FPGAs as a service for end user 440 and macro vendors 410 and 420.

In the various embodiments of this invention, methods and structures have been described to securely distribute and use third party macros. The macro is secured by preventing any user from being able to view the macro design. Thus, the possibility of unlicensed use of the macro is diminished. By providing a secure method to distribute macros, macro vendors are motivated to expend the time and effort to create large libraries of optimized macros to sell to end users. Thus, the cost and time for creating design files for FPGAs by an end user can be reduced through the use of macros from macro vendors.

The various embodiments of the structures and methods of this invention that are described above are illustrative only of the principles of this invention and are not intended to limit the scope of the invention to the particular embodiments described. For example, in view of this disclosure, those skilled in the art can define other marked design files, macro markers, macros, macro managers, configuration devices, FPGAS, CLBs, IOBs, PSMs, configuration access ports, configuration ports, and so forth, and use these alternative features to create a method, circuit, or system according to the principles of this invention. Thus, the invention is limited only by the following claims.

What is claimed is:

1. A method to program an FPGA comprising the steps of:
   creating a marked design file incorporating a first macro marker identifying a first macro and further incorporating a user design including said first macro;
   replacing said first macro marker with said first macro in said marked design file; and
   converting said marked design file into configuration data, wherein said configuration data incorporates said first macro and said user design.

2. The method of claim 1, further comprising the step of obtaining said first macro marker from a first macro vendor.

3. The method of claim 1, further comprising the step of obtaining said first macro from a first macro vendor.

4. The method of claim 3, wherein said step of obtaining said first macro from a first macro vendor is performed by a macro manager.

5. The method of claim 1, further comprising the step of programming said FPGA with said configuration data.

6. The method of claim 5, wherein said step of programming said FPGA with said configuration data is performed by an end user.

7. The method of claim 5, wherein said step of converting said marked design file into configuration data is performed by a macro manager.

8. The method of claim 1, wherein said step of creating a marked design file incorporating a first macro marker identifying a first macro is performed by an end user.

9. The method of claim 1, further comprising the step of incorporating a second macro marker identifying a second macro in said marked design file.

10. The method of claim 9, wherein said configuration data incorporates said second macro.

11. The method of claim 9, further comprising the step of obtaining said second macro marker from a second macro vendor.

12. The method of claim 11, wherein said step of obtaining said second macro marker from a second macro vendor is performed by an end user.

13. The method of claim 9, further comprising the step of obtaining said second macro from a second macro vendor.

14. The method of claim 13, wherein said step of obtaining said second macro from a second macro vendor is performed by a macro manager.

15. A method to program an FPGA comprising the steps of:
   creating a marked design file incorporating a first macro marker identifying a first macro;
   providing said marked design file to a macro manager, wherein said macro manager incorporates said first macro into said marked design file based on said first macro marker; and
   receiving configuration data from said macro manager based on said marked design file.

16. The method of claim 15, further comprising the step of obtaining said first macro marker from a first macro vendor.

17. The method of claim 15, further comprising the step of programming said FPGA with said configuration data.

18. The method of claim 15, further comprising the step of incorporating a second macro marker identifying a second macro in said marked design file.

19. The method of claim 15, wherein said marked design file is provided to said macro manager by way of a secured medium.

20. The method of claim 19, wherein said secured medium is an encrypted channel of a public network.

21. A method to acquire a programmed FPGA, the method comprising the steps of:
   creating a marked design file incorporating a first macro marker identifying a first macro;
   providing said marked design file to a macro manager, wherein the macro manager incorporates said first macro into said marked design file based on said first macro marker, generates configuration data based on said marked design file, and programs an FPGA with said configuration data to generate the programmed FPGA; and
   receiving the programmed FGPA from the macro manager.

22. The method of claim 21, further comprising the step of obtaining said first macro marker from a first macro vendor.

23. The method of claim 21, further comprising the step of incorporating a second macro marker identifying a second macro in said marked design file.

24. A method to program an FPGA comprising the steps of:
   receiving a marked design file incorporating a first macro marker identifying a first macro from an end user;
   replacing said first macro marker with said first macro in said marked design file; and
   converting said marked design file into configuration data.

25. The method of claim 24, further comprising the step of providing said configuration data to said end user.

26. The method of claim 24, further comprising the steps of:
   programming said FPGA with said configuration data; and
   providing said FPGA to said end user.

27. The method of claim 24, wherein said marked design file incorporates a second macro marker identifying a second macro.

28. The method of claim 24, further comprising the step of obtaining said first macro from a first macro vendor.

29. The method of claim 24, where said step of converting said marked design file into configuration data comprises a step of replacing said first macro marker with said first macro.

* * * * *